United States Patent
Schilling et al.

(10) Patent No.: US 6,722,556 B2
(45) Date of Patent: Apr. 20, 2004

(54) METHOD AND DEVICE FOR JOINING AT LEAST TWO ADJOINING WORK PIECES BY FRICTION WELDING

(75) Inventors: Christoph Schilling, Meyn (DE); Jorge dos Santos, Lüneburg (DE)

(73) Assignee: GKSS Forschungszentrum Geesthacht GmbH, Geesthacht (DE)

( * ) Notice: Subject to any disclaimer, the term of this patent is extended or adjusted under 35 U.S.C. 154(b) by 28 days.

(21) Appl. No.: 10/172,816

(22) Filed: May 16, 2002

(65) Prior Publication Data

US 2002/0179682 A1 Dec. 5, 2002

Related U.S. Application Data

(63) Continuation-in-part of application No. PCT/DE00/04054, filed on Nov. 17, 2000.

(30) Foreign Application Priority Data

Nov. 18, 1999 (DE) .......................................... 199 55 737

(51) Int. Cl.[7] .............................................. B23K 20/12
(52) U.S. Cl. ..................................... 228/112.1; 228/2.1
(58) Field of Search ................................ 228/112.1, 2.1

(56) References Cited

U.S. PATENT DOCUMENTS

| | | | | |
|---|---|---|---|---|
| 5,893,507 A | * | 4/1999 | Ding et al. | 228/2.1 |
| 6,299,050 B1 | * | 10/2001 | Okamura et al. | 228/110.1 |
| 6,595,403 B2 | * | 7/2003 | Okamura et al. | 228/112.1 |
| 2002/0125297 A1 | * | 9/2002 | Stol et al. | |
| 2002/0179682 A1 | * | 12/2002 | Schilling et al. | |
| 2003/0075584 A1 | * | 4/2003 | Sarik et al. | |

FOREIGN PATENT DOCUMENTS

WO    WO 99/39861    * 8/1999

* cited by examiner

*Primary Examiner*—Kiley Stoner
(74) *Attorney, Agent, or Firm*—Klaus J. Bach

(57) ABSTRACT

In a method and apparatus for joining at least two adjoining workpieces by friction welding, a rotatable shaft is provided at its front end with a friction welding tool which is biased toward the workpieces to plasticize an area of the workpiece into which the tool enters while the plasticized material is displaced and stored in, or around, the tool. Upon passing through the top workpiece and entering the lowermost work piece, the tool is removed and the stored plasticized material is returned to the void provided by the tool upon removal thereof from the workpieces for joining the workpieces.

18 Claims, 2 Drawing Sheets

METHOD AND DEVICE FOR JOINING AT LEAST TWO ADJOINING WORK PIECES BY FRICTION WELDING

This is a Continuation-In-Part application of international application PCT/DE00/04054 filed Nov. 17, 2000 and claiming the priority of German application 199 55 737 .3 filed Nov. 18, 1999.

BACKGROUND OF THE INVENTION

The invention relates to a method for joining at least two adjoining work pieces by friction welding wherein the work pieces include an adjoining area, in which they are plasticized by a rotating pin-like projecting tool which is in contact with the adjacent surface areas of the work pieces and to an apparatus for performing such a method.

A similar method and apparatus are known from EP-B-O 615 480. The friction welding, which is also called friction stir welding (FSW), has been basically known for several years. Originally, the friction stir welding was performed in such a way that two work pieces, which were to be joined by friction welding, were moved relative to each other in the area in which they were to be joined while they were pressed against each other with a predetermined adjustable force. As a result of the heat generated by the friction, the material of the work pieces was plasticized in the area of the jointure. Upon sufficient plastification, the materials of the two workpieces intermix sufficiently so that, upon cooling, the desired weld connection between the two workpieces is formed.

In the method and the apparatus mentioned above, a pin-like projection, which is rotated by a drive or motor at a high speed, is disposed in the adjoining area between two workpieces to be joined and the pin-like projection is guided along the adjoining area for example by a special guide arrangement or by a robot. Additionally, it may be subjected to a translatory movement along the adjoining edges of the workpieces. When, after the beginning of the welding procedure, the material of the workpieces is sufficiently plasticized by the frictional heat generated by the rotation of the pin-like projection, the adjoining workpieces while the rotation of the pin-like projection, the pin-like projection is moved along the seam between the adjoining workpieces while the rotation of the pin-like projection is maintained whereby an elongated seam is formed.

It is known that two or more metallic workpieces can be joined by so-called spot welding connections which, with regard to rivet or screw connections, have the advantage that no joining elements (rivets, screws, etc.) are needed and that the joints can be established very rapidly since no holes have to be drilled through the workpieces for receiving the rivets or screws and that further no rivets or screws have to be inserted through the holes and to be compressed or tightened.

While the spot welding of two workpieces of iron or steel or their alloys to be joined can be performed with commercially available spot welding apparatus, the spot welding of two or more adjacent workpieces of aluminum or aluminum alloys as they are used in airplane or motor vehicle assembly procedures is still problematic. The reason is that aluminum and aluminum alloys form with the oxygen of the ambient air on their surfaces an oxide layer which provides for a high electrical resistance between the workpieces to be joined so that, furthermore, the molten material lens formed between the workpieces includes aluminum oxide which detrimentally affects the strength of the joints. As a result, the spot-welding joints of aluminum workpieces do not have the strength required for many applications.

Particularly in the construction of airplanes where highest qualities of the jointure between workpieces are of utmost importance, the use of spot-welding instead of rivet connections has been abandoned. The same is true in the construction of motor vehicles where, increasingly, aluminum is used for chassis and body components.

It is therefore the object of the present invention to provide a method and apparatus for providing high-strength connections between metallic and also non-metallic workpieces, which do not require additional connecting elements and which are reproducible with high precision and in a simple manner. With the method and apparatus according to the invention oxide-free connections should be established and flat continuous surface areas should be established during the welding at both sides of the jointure area. At the same time, the method and apparatus should be simple and the method should be executable by manufacturing robots.

SUMMARY OF THE INVENTION

In a method and apparatus for joining at least two adjoining workpieces by friction welding, a rotatable shaft is provided at its front end with a friction welding tool which is biased toward the workpieces to plasticize the engaged area of the workpiece into which the tool enters while the plasticized material is displaced and stored in, or around, the tool. Upon passing through the top workpiece and entering the lowermost work piece, the tool is removed and the stored plasticized material is returned to the void provided by the tool upon removal thereof from the workpieces for joining the workpieces.

The plasticized material is retained and, upon removal of the pin-like projection, is pressed back into the space voided by the removal of the tool.

The advantage of the method according to the invention resides mainly in the fact that, in contrast to the various known methods for joining two or more workpieces, it is not necessary to subject the areas to be joined to specific pre-treatments. It is not necessary to drill holes into the workpieces, no additional connecting elements are needed, no additional operating step such as the formation of rivet heads or the screwing of screws or bolts or the mounting of nuts, is needed. There is no head—contrary to the bolt friction welding, and no beads of plasticized material or holes or depressions are formed. Furthermore, with the use of workpieces of aluminum or aluminum alloys or other lightweight materials or alloys, only minor amounts of oxides will be included in the joint since the jointure area of all the workpieces being joined are plasticized and the materials are intermixed. No surface area oxide concentrations will therefore be present anywhere in the material joints. Since, with the method according to the invention all the plasticized material is pressed back into the joint area, the surface on the active side, that is, the side of the workpieces from which the pin-like projection extends into the workpieces, becomes again planar while the opposite side remains planar in any case since the pin-like projection does not extend through this side.

In order to prevent that, as a result of the insertion of the rotating pin-like projection into the workpieces that is into the lower workpiece and the displaced material flows to the surrounding area in an uncontrolled manner so that it is not available for forming the jointure, the displaced material is retained in the immediate area around the rotating pin-like projection.

Preferably, the displaced material is returned, upon removal of the pin-like projection, into the void formed thereby at the same rate at which the pin-like projection is retracted from the workpiece, whereby it is made sure that all of the plasticized material is returned and the surface of the workpiece from which the pin-like projection extends into the workpiece is again completely planar after completion of the jointure.

In this way, in contrast to the bolt friction welding, a large force transmitting area is generated which is capable of accommodating also high shear loads.

In order to provide for a rapid procedure, it is advantageous if the workpieces are preheated, in the areas in which the jointure is to be established, from the side from which the procedure is performed and also from the opposite side. This has the advantage that not the whole heat input has to be provided by friction heat. With a controlled preheating only a differential amount of heat in excess of the external heat input has to be provided by friction for the plastification of the material by the friction welding procedure.

In this way, the process according to the invention can be substantially accelerated.

With the apparatus for the jointure of at least two adjacent workpieces in accordance with the method of the invention, the pin-like projection is moved axially through the material of the first workpiece as it is being plasticized at least partially into the second workpiece.

During this procedure, the sleeve surrounding the pin-like projection moves back to permit the pin-like projection to enter the workpiece while still surrounding the welding area.

The advantages achieved by the device according to the invention have been pointed out earlier. The rotational speed of the pin-like projection can be selected depending on the type of workpiece, the number of workpieces and the material of which the workpieces consist. Furthermore, the speed of the pin-like projection may be changed during the establishment of the jointure particularly when the pin-like projection enters a lowermost workpiece, which is also plasticized, in order to prevent a melt-through through the lower surface of the lower workpiece.

In a particular embodiment of the device for joining at least two workpieces disposed on top of one another by friction welding, the workpieces encompass between them a joint area and wherein a rotatable shaft is provided which shaft can be driven at high speed and includes a friction welding tool, the friction welding tool is a sleeve element which is rotated by the shaft. During rotation, the friction welding tool is brought into contact with the connecting area of the workpieces. The friction-welding tool is then moved axially through the material being plasticized until it reaches and enters partially a last lowermost workpiece.

Also for this additional embodiment reference is made to the advantages described earlier. The additional embodiment is advantageous for certain applications if the sleeve element has a greater diameter for producing a wider weld area than the pin-like projection.

Expediently, the pin-like projection is surrounded by a first rotating sleeve element. During axial movement of the pin-like projection into the workpieces or through the workpieces the first sleeve element moves axially in the opposite direction. When the desired penetration depth of the pin-like projection into the workpiece has been achieved and the pin-like projection is retracted from the workpiece, the sleeve element moves toward the workpiece in order to push the plasticized material back into the workpiece.

In connection with the second embodiment, it is advantageous if the sleeve element includes in its interior, a pin which moves in a direction opposite to the axial movement of the sleeve element. When the sleeve element enters the workpiece, the pin within the sleeve element provided for the space accommodating the material being plasticized which is advantageous when larger diameter friction welding areas are formed.

The amount of axial movements of the pin-like projection and of the first sleeve element are so selected that the plasticized material volume displaced by the insertion of the friction welding element can be accommodated and the plasticized material is held under a certain hydrostatic pressure during the whole joining procedure, in order to ensure an optimal jointure to the materials of the interconnected workpieces. In this way, it is made sure in a simple manner that, after completion of the jointure, all of the plasticized material is returned to the plasticized area of the two or of all of the workpieces.

In order to ensure that, during insertion of the pin-like projection into the workpieces as well as during the removal of the pin-like projection from the workpieces, the plasticized material does not flow in an uncontrolled way out of the friction welding area, it is advantageous if the pin-like projection is surrounded by a non-rotating outer second sleeve element by way of which the workpieces are also pressed together at the beginning of the welding procedure. This second outer sleeve element therefore compresses the workpieces in the area of the jointure to be formed with the aid of a counter support structure so that, in the connecting area, there are no gaps between the work pieces. It furthermore forms an outer wall, which prevents the plasticized material displaced by the insertion of the pin-like projection to flow from the friction welding area.

Expediently, in this case, the first sleeve element which rotates together with the pin-like projection is guided in the outer second sleeve element.

In principle, it is possible to provide for the axial movability of the pin-like projection and the axial movability of the first sleeve element in the opposite direction by outside means such as a suitable tool head of a manufacturing robot. However, in order to keep the control sequences of a robot or another manufacturing apparatus which operates the device according to the invention as far as possible away from the manufacturing robot, or respectively, apparatus and in order to be able to rapidly exchange the device in case of malfunctions without the need for reprogramming the manufacturing robot or apparatus the control of the axial movements of the pin-like projection and of the first sleeve element in the opposite direction is preferably provided by a spiral groove guide structure in a control ring element in which control pins are received. In this way, the axial movability of the pin-like projection and the axial movement of the first sleeve element coupled therewith are realized within the device.

To this end, expediently, a housing is provided in which the control ring element is supported so as to be rotatable by means of an operating lever operable from without the housing.

In principle, the pin-like projection may be disposed at the axial end of a drive shaft or it may be part of a drive shaft, which may be suitably mounted to a robot. Since the pin-like projection is subjected to a high mechanical and thermal load, it is advantageous if the pin-like projection is a separate component, which can be easily exchanged whenever this becomes necessary. To this end, a rotatable pin support element is preferably provided in the device on which the pin-like projection is firmly mounted for rotation therewith.

Since, for providing a jointure according to the invention of several workpieces, the pin-like projection needs to move axially toward the workpieces the device would have to be moved in accordance with such axial movement if it would be mounted to a robot or other suitable apparatus. Such movement would have to be provided for example by the operating head of a manufacturing robot. In order to eliminate the need for the robot to perform such movement sequences in both axial directions and to transfer this function to the device itself it would be expedient to provide a shaft which engages the pin support element for rotation with the shaft but is axially movable relative thereto.

Preferably, the pin-like projection is circular in cross-section that is, it is an essentially cylindrical member. However, it is not absolutely necessary that the pin-like projection has a circular cross-section; basically it may have any suitable cross-sectional shape. Also, the sleeve element has preferably a circular cross-section and has an axial opening in which the pin-like projection is received and guided. Also in this case, the pin-like projection does not necessarily have a circular cross-section. It is sufficient if the pin-like projection has a cross-section of such a shape that it can be accommodated within the sleeve element and guided therein in a rotation-symmetrical manner.

Finally, it may also be advantageous to provide a sleeve element with a cross-section for receiving and guiding the pin-like projection with an axial opening which cross-section is not circular. In that case, the cross-section of the pin-like projection is adapted in shape to the cross-section of the opening of the sleeve element, wherein the cross-section of the sleeve element and of the pin-like projection may have any suitable shape.

The invention will be described below in greater detail on the basis of the accompanying schematic drawings.

DETAILED DESCRIPTION OF AN EMBODIMENT

Figure 1A:
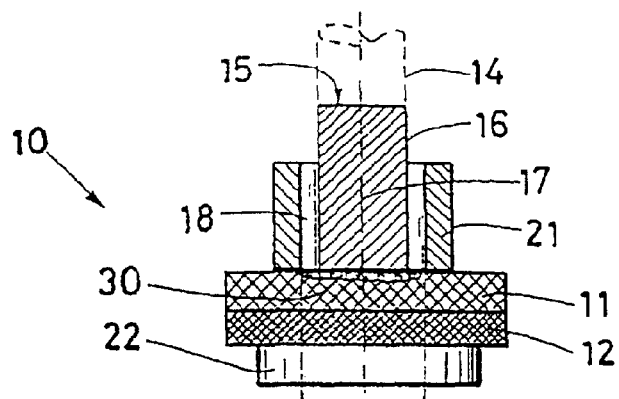
FIGS. 1a to 1e show, in cross-sectional views, schematically the design of the operating head of a device including a pin-like projection, a first and a second sleeve element disposed on two workpieces to be joined during different steps of the joining process in which the material of the two workpieces is plasticized for the jointure of the two workpieces.
Figure 1B:
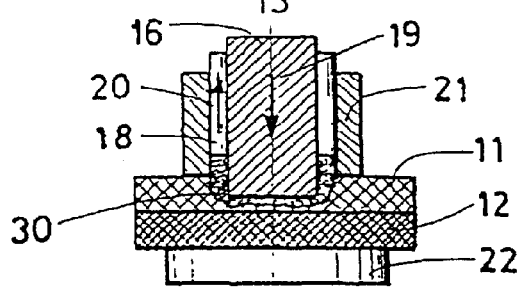
Figure 1C:
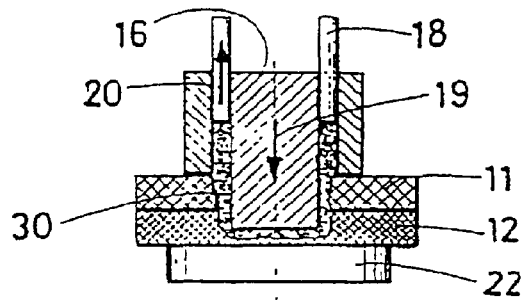
Figure 1D:
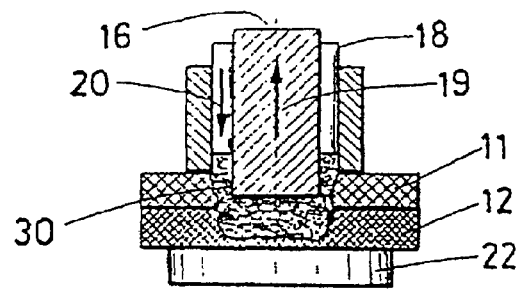
Figure 1E:
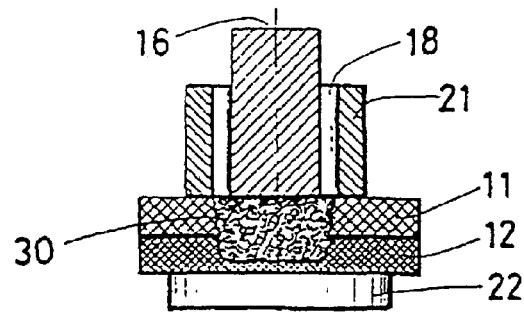
Figure 2:
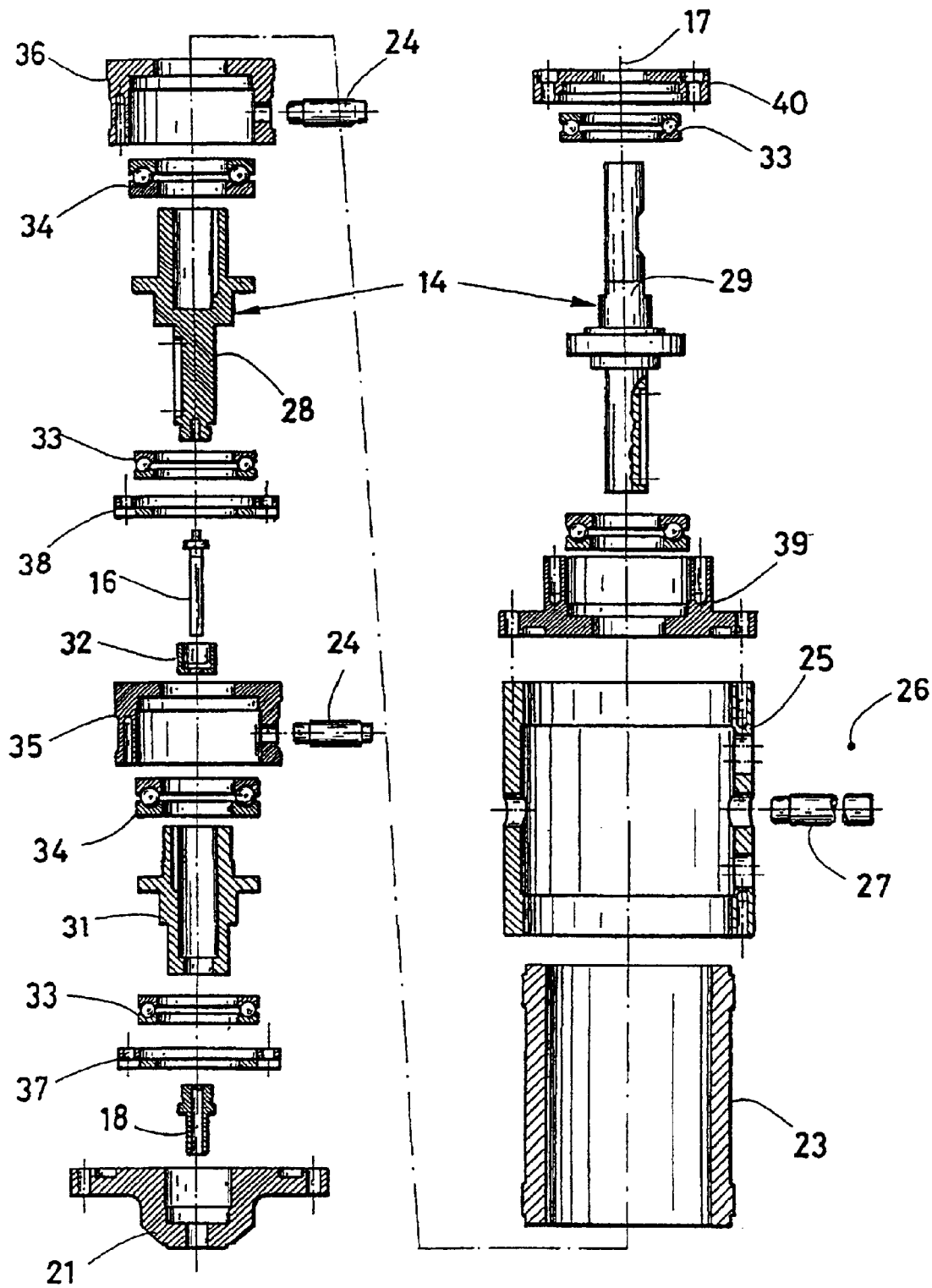
FIG. 2 is an exploded view of an exemplary embodiment of the device according to the invention.

First, reference is made to FIG. 2 showing, in an exploded view, a device 10 by which the method according to the invention can be performed. The core elements of the device 10 are the pin-like projection 16, the first sleeve element 18, the second sleeve element 21 as well as the drive shaft 14, which, in the embodiment shown, comprises the pin support member 28 and the shaft element 29—see also the corresponding elements in FIGS. 1a to 1e. The pin-like projection 16 and the first sleeve element 18 may also be profiled in another suitable manner such that a transport channel for the plasticized material 30 is formed. The pin-like projection 16, which is received in the sleeve element 18 and the first sleeve element 18 itself are received in the second sleeve element 21, which in the embodiment shown, is in the form of a housing bottom.

For the transfer of axial forces, the first sleeve element 18 is screwed into a sleeve support member 31. The pin-like projection 16 is mounted to the pin support member 28 using a pin nut 32. The sleeve support member 31 with the first sleeve element 18 is supported rotatably together with the pin-like projection 18—like the pin support member 28. The sleeve support member 31 and the pin support member 28 are supported by bearings 33, 34, which are mounted to bearing support structures 35, 36. The bearing packages are held together by retaining rings 37, 38. The bearing support structures 35, 36 are slidably supported in a control sleeve 23 and therefore provide for the axial movability of the first sleeve element 18 and of the pin-like projection 16. The bearing support structures 35, 36 are supported so as to be non-rotatable. This is achieved by control bolts 24, for example, three control bolts, which extend through the control sleeve 23 (the radial passages are not shown) into grooves (not shown) formed in the annular housing 25 whereby the bearing support structures are permitted to move only axially.

The control sleeve 23 is rotatably supported in the housing 25. Axial movements are prevented by its bearing support on the second sleeve element 21, which forms the housing bottom and acts as a shaft support structure 39. The control sleeve 23 includes spiral grooves where the control bolts 24 of the bearing support structures 35, 36 extend to the control sleeve 23. The spiral grooves have a certain pitch with respect to the axis of rotation 17. A rotation of the control sleeve 23 results therefore in axial movement of the first sleeve element 18 and of the pin-like projection 1. The control sleeve 23 is rotated by way of a lever 27 from without (26) the annular housing 25, which lever 27 is screwed into the control sleeve 23. The lever 27 is guided in a groove (not shown) formed into the outer surface of the control sleeve 23.

The rotation necessary for the operation of the devices 10 is introduced by way of the shaft element 29, which forms part of the shaft 14. It is driven for example by a manufacturing robot, which is not shown in the figures, or by another drive apparatus. The rotation is transmitted by way of a slide key to the pin support member 20, which is also part of the drive shaft. The pin support member 28 is again supported for rotation with the sleeve support member 31 by way of a slide key. In this way, the necessary torque can be transmitted to the pin-like projection 16 and to the first sleeve element 18. The shaft element 29 is supported in the shaft support structure 39 by way of the bearings 33, 34. A disc-like cover 40 retains the bearing package.

At one side, the shaft element 29 is provided with a profile for connection to a tool holder of for example a manufacturing robot. The housing 25 is provided with a retaining lever by which the device 10 is prevented from rotation when a torque is applied to the shaft element 29.

For performing the method according to the device 10 (see also FIGS. 1a to 1c) the device 10 is inserted with the shaft element 29 into a tool holder of a drive unit (manufacturing robot, drive arrangement) and is fixed therein. Below the device 10 two work pieces of aluminum or aluminum alloys are fixed on top of one another. Below the device and the workpieces, a support structure 22 is provided. By way of the drive arrangement, the rotating parts of the device 10, that is, the first sleeve element 18 and the pin-like projection 16 are brought up to a speed as needed for establishing a weld connection. The device 10 is held in portion by the lever 27. This task can of course also be performed by the drive unit (manufacturing robot, drive arrangement).

First, the second sleeve element 21, which represents the housing bottom of the device 10 is placed into contact with the topside of a workpiece 11, shown in FIGS. 1a to 1c, by moving the device 10 toward the workpiece 11. The material of the workpiece 11 is then plasticized under the rotating pin-like projection 16 and also under the rotating first sleeve element 18.

By actuating the lever 27, possibly by the manufacturing robot or by another operating mechanism, the control ring 23 is rotated. By means of the spiral grooves, the control bolt 24 and the bearing support structure 35, the pin support member 28 together with the pin-like projection 16 is then moved downwardly as indicated by the arrow 19. The pin-like projection 16 then enters into the material of the workpiece 11, see FIG. 1b. Because of the mechanism described earlier, the first sleeve element 18 is moved at the same time in the opposite direction as indicated by the arrow 20. To this end, spiral grooves are provided with a pitch which is opposite to that of the spiral grooves referred to earlier. Because of the axial movement of the sleeve element 18 in the direction of the arrow 20 opposite to the movement direction of the pin-like projection 16, a volume is provided into which the plasticized material 30 displaced by the advancing pin-like projection can enter. When the desired insertion depth has been reached, see FIG. 1c, the lever 27 is moved back. Upon return of the pin-like projection 16 to its original position, the displaced plasticized material flows back into the hole, which is evacuated by the retraction of the pin-like projection 16 and into which the plasticized material is pressed at the same time by the sleeve element 18. When the lever 27 is again in its original position, the device 10 can be removed from the workpieces 11, 12.

In this connection, it is pointed out that, in the example presented herewith, only two workpieces 11 and 12 are provided and are joined by the welding method according to the invention. However, with the device 10 or, respectively, the method according to the invention, more than two workpieces can be joined together without any change in the method. Also, the device remains unchanged if more than two workpieces are to be joined.

What is claimed is:

1. A method for joining at least two adjoining workpieces by friction welding in an area in which said at least two workpieces are disposed adjacent one another utilizing a pin-like projection, said method comprising the steps of rotating said pin-like projection, moving said pin-like projection toward said adjoining workpieces in the area where they are to be joined and moving said pin-like projection through the top workpiece and into the lowermost workpiece while plasticizing the material of said workpieces adjacent said rotating pin-like projection whereby some of said plasticized material is displaced and then retracting said pin-like projection from said workpieces and re-inserting the displaced plasticized material into the space voided by the retraction of said pin-like projection about at the same rate at which said pin-like projection is retracted.

2. A method according to claim 1, wherein said plasticized material displaced by the insertion of the rotating pin-like projection through the top workpieces and into the lowermost workpiece is contained in the area immediately adjacent said pin-like projection.

3. A method according to claim 1, wherein said workpieces are heated in the areas in which they are to be joined before said rotating pin-like projection is moved into said workpieces.

4. A method according to claim 3, wherein said workpieces are heated from the side from which said rotating pin-like projection is entered as well as from the opposite side.

5. A device for joining at least two adjoining workpieces by friction welding in a connecting area in which said adjoining workpieces are disposed closely adjacent one another, said device comprising a rotatable shaft having a rear end to be connected to drive means for rotating said shaft and a front end provided with a pin-like projection for contacting said workpieces and plasticizing part of said workpieces by friction generated by said pin-like projection when being rotated in contact with said workpieces, said pin-like projection being supported so as to be axially movable through at least a first workpiece disposed adjacent said pin-like projections and into a last lowermost workpiece, said pin-like projection being surrounded by a first sleeve element supported so as to be rotatable together with said pin-like projection but being movable axially in the direction opposite to the direction of movement of said pin-like projection.

6. A device according to claim 5, wherein said pin-like projection is surrounded by a non-rotating outer sleeve element for engaging and compressing said workpieces.

7. A device according to claim 6, wherein said first sleeve element is supported and guided in said second sleeve element.

8. A device according to claim 5, wherein a control sleeve surrounds said pin-like projection and said first sleeve element and pins are engaged in spiral grooves formed in said control sleeve for moving said first sleeve element and said pin-like projection in opposite directions upon rotation of said control sleeve.

9. A device according to claim 8, wherein a housing is provided in which said control sleeve is received and a lever extends through said housing for rotating said control sleeve in said housing.

10. A device according to claim 5, wherein a pin support member is rotatably supported in said device and said pin-like projection is removably mounted to said pin support member.

11. A device according to claim 10, wherein a shaft element is supported in said device and said pin support member is keyed to said shaft element for rotation therewith but being axially movable relative to said shaft element.

12. A device according to claim 5, wherein said pin-like projection is circular in cross-section.

13. A device for joining at least two adjoining work pieces by friction welding in a connecting area in which said workpieces are disposed closely adjacent one another, said device comprising a rotatable shaft having a rear end to be connected to drive means for rotating said shaft and a front end provided with a friction welding tool, said friction welding tool including a pin-like sleeve element mounted for rotation with said shaft, said sleeve element being axially movable into contact with the connecting area of said workpieces and, upon plastification of the workpiece material in contact with said sleeve, through the plasticized workpiece material of least the first workpiece and at least partially into the last workpiece for joining said workpieces upon retraction of said sleeve element from said workpieces.

14. A device according to claim 13, wherein said pin-like sleeve element includes a pin extending into said sleeve element and being supported so as to be movable axially in a direction opposite to the movement of said sleeve element in order to provide a space within said sleeve element for accommodating plasticized material as said sleeve element moves into said workpieces.

15. A device according to claim 14, wherein the distances of axial movements of said pin and said sleeve element are essentially the same.

16. A device according to claim 13, wherein said pin-like sleeve element is surrounded by, and axially movably supported in a second sleeve element.

17. A device according to claim 13, wherein a control sleeve surrounds said pin-like sleeve element and said first sleeve element and guide pins are engaged in spiral grooves formed in said control sleeve for moving said first sleeve element and said pin-like sleeve element in opposite directions upon rotation of said control sleeve.

18. A device according to claim 13, wherein said sleeve element is circular in cross-section and has a circular central opening in which said pin is axially movably supported.

* * * * *